(12) United States Patent
Park et al.

(10) Patent No.: US 10,394,370 B2
(45) Date of Patent: Aug. 27, 2019

(54) APPARATUS AND METHOD FOR RECOGNIZING TOUCH INPUT USING INTERPOLATION

(71) Applicant: HYUNDAI MOTOR COMPANY, Seoul (KR)

(72) Inventors: Sung Min Park, Seoul (KR); Kwang Myung Oh, Suwon-si (KR); Sung Jin Sah, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 244 days.

(21) Appl. No.: 15/367,898

(22) Filed: Dec. 2, 2016

(65) Prior Publication Data

US 2017/0322664 A1 Nov. 9, 2017

(30) Foreign Application Priority Data

May 4, 2016 (KR) .................. 10-2016-0055661

(51) Int. Cl.
| | | |
|---|---|---|
| *G06F 3/041* | (2006.01) | |
| *B60K 35/00* | (2006.01) | |
| *G06F 3/0346* | (2013.01) | |
| *G06F 3/0354* | (2013.01) | |
| *G06F 3/0484* | (2013.01) | |

(Continued)

(52) U.S. Cl.
CPC ............ *G06F 3/0416* (2013.01); *B60K 35/00* (2013.01); *G06F 3/0346* (2013.01); *G06F 3/03547* (2013.01); *G06F 3/0418* (2013.01); *G06F 3/0488* (2013.01); *G06F 3/04845* (2013.01);

(Continued)

(58) Field of Classification Search
CPC .. G06F 3/0488; G06F 3/04883; G06F 3/0416; G06F 3/04847; G06F 3/044; G06F 3/041; B60K 2350/1024; B60K 2350/1052; B60K 2350/1028; B60K 2350/928; B60K 2350/2013

See application file for complete search history.

(56) References Cited

U.S. PATENT DOCUMENTS 8,904,057 B2 * 12/2014 Ohta ..................... G06F 3/0418
345/173
9,588,619 B2 * 3/2017 Christiansson ....... G06F 3/0418
(Continued)

FOREIGN PATENT DOCUMENTS

JP 2012-221359 A 11/2012
JP 2013-246482 A 12/2013
(Continued)

OTHER PUBLICATIONS

Korean Office Action issued in Application No. 10-2016-0055661 dated Jan. 31, 2017.

*Primary Examiner* — Gerald Johnson
(74) *Attorney, Agent, or Firm* — Morgan Lewis & Bockius LLP

(57) ABSTRACT

An apparatus for recognizing a touch input includes: a touch input detector detecting a touch input signal depending on a force-based touch input on a touch pad; a vehicle movement detector sensing movement of a vehicle; and a processor configured to detect an abnormal signal generated by the movement of the vehicle in the touch input signal and to recognize the touch input by performing signal interpolation on an abnormal signal generation section in which the abnormal signal is generated.

20 Claims, 8 Drawing Sheets

(51) Int. Cl.
  *G06F 3/0488* (2013.01)
  *G06F 3/044* (2006.01)
(52) U.S. Cl.
  CPC ...... *B60K 2350/1028* (2013.01); *G06F 3/044* (2013.01); *G06F 2203/04105* (2013.01)

(56) References Cited

U.S. PATENT DOCUMENTS

| | | | | |
|---|---|---|---|---|
| 2005/0259087 | A1* | 11/2005 | Hoshino | G06F 3/016 345/173 |
| 2008/0302014 | A1* | 12/2008 | Szczerba | B60K 35/00 49/31 |
| 2011/0050563 | A1* | 3/2011 | Skutt | G06F 3/033 345/156 |
| 2013/0082970 | A1* | 4/2013 | Frey | G06F 3/0414 345/173 |
| 2013/0194193 | A1* | 8/2013 | Kawalkar | G06F 3/041 345/173 |
| 2015/0062386 | A1* | 3/2015 | Sugawara | G02B 7/34 348/241 |

FOREIGN PATENT DOCUMENTS

| | | |
|---|---|---|
| JP | 2015-079364 A | 4/2015 |
| KR | 10-1998-042097 A | 8/1998 |
| KR | 10-2014-0145579 A | 12/2014 |
| WO | 2014/084874 A2 | 6/2014 |

\* cited by examiner

_(1)_

APPARATUS AND METHOD FOR RECOGNIZING TOUCH INPUT USING INTERPOLATION

CROSS-REFERENCE TO RELATED APPLICATION

This application is based on and claims the benefit of priority to Korean Patent Application No. 10-2016-0055661, filed on May 4, 2016 in the Korean Intellectual Property Office, the disclosure of which is incorporated herein in its entirety by reference.

TECHNICAL FIELD

The present disclosure relates to a method for recognizing a touch input, and more particularly, to an apparatus and a method for recognizing a touch input using interpolation capable of recognizing the touch input by interpolating distortion of an input signal due to an external factor at the time of recognizing the touch input on a force-based touch pad.

BACKGROUND

A touch pad is a user interface allowing a user to touch a defined contact surface using his/her finger, a stylus pen, or the like, to simply and intuitively input a user manipulation. The touch pad has been used in various fields, such as a navigation device, a telematics terminal, a personal digital assistant (PDA), a laptop computer, a notebook computer, a smart phone, and the like.

The touch pad uses a touch recognizing technology such as resistive overlay, capacitive overlay, surface acoustic wave, infrared beam, or the like.

Since an existing touch pad recognizes a touch position at the moment at which a hand touches the touch pad, it does not provide a blind control. In order to solve this problem, a force-based touch pad sensing touch force to recognize user's search and input intentions has been suggested.

The force-based touch pad may recognize a touch input depending on a user's intention when an external factor hindering a touch operation of the user is not present. However, in the case in which the touch operation of the user is hindered by the external factor, the force-based touch pad generates a distorted touch input different from the user's intention to erroneously recognize the touch input.

For example, when the force-based touch pad is used in a vehicle, when a finger of the user applying pressure to the force-based touch pad is separated from the force-based touch pad due to vibrations generated while the vehicle passes through a speed bump when the user performs a touch input on the force-based touch pad, the force-based touch pad recognizes a touch input different from the user's intention.

In addition, when one or more of sensors provided in the force-based touch pad are erroneously operated, the force-based touch pad recognizes a touch input distorted from a user's intention.

SUMMARY

The present disclosure has been made to solve the above-mentioned problems occurring in the prior art while advantages achieved by the prior art are maintained intact.

An aspect of the present disclosure provides an apparatus and a method for recognizing a touch input capable of recognizing the touch input by interpolating distortion of an input signal due to an external factor at the time of recognizing the touch input on a force-based touch pad.

According to an exemplary embodiment of the present disclosure, an apparatus for recognizing a touch input includes: a touch input detector detecting a touch input signal depending on a force-based touch input on a touch pad; a vehicle movement detector sensing movement of a vehicle; and a processor configured to detect an abnormal signal generated by the movement of the vehicle in the touch input signal and to recognize the touch input by performing signal interpolation on an abnormal signal generation section in which the abnormal signal is generated.

The touch pad may include: a touch substrate; and a force sensor measuring touch force applied onto the touch substrate.

The force sensor may include a plurality of force sensors, and the force sensor may be any one of a strain gauge, a force sensitive resistor (FSR), and a capacitance sensor.

The vehicle movement detector may detect an acceleration of the vehicle using an acceleration sensor provided in the vehicle or an acceleration sensor mounted in the touch pad.

The abnormal signal generation section may be a discontinuous section of the touch input signal or a section in which the touch input signal less than a threshold is detected.

The processor may perform the signal interpolation between a first touch input signal and a second touch input signal, when the second touch input signal is detected within a first reference time after detection of the first touch input signal is stopped.

The processor may recognize that the second touch input signal is a new touch input, when the second touch input signal is detected after a second reference time elapses after the detection of the first touch input signal is stopped.

The processor may connect the first touch input signal and the second touch input signal to each other using the signal interpolation, when a high frequency component is decreased in an abnormal signal generation section between the first touch input signal and the second touch input signal.

The processor may recognize that the second touch input signal is a new touch input when the high frequency component is not decreased in the abnormal signal generation section.

According to another exemplary embodiment of the present disclosure, a method for recognizing a touch input includes: sensing a force-based touch input on a touch pad; deciding a form of the touch input; receiving a touch input signal depending on the touch input; confirming whether or not an abnormal signal is generated in the touch input signal; and recognizing the touch input by performing signal interpolation on an abnormal signal generation section in consideration of movement of a vehicle, when the abnormal signal is detected in the touch input signal.

In the step of deciding the form of the touch input, the touch input may be divided into a push input and a drag input.

In the step of confirming whether or not the abnormal signal is generated, it may be confirmed whether or not a discontinuous section of the touch input signal or a section in which a touch input signal less than a threshold is detected is present.

In the step of recognizing the touch input, when a second touch input signal is detected within a first reference time after detection of a first touch input signal is stopped, the signal interpolation may be performed between the first touch input signal and the second touch input signal.

In the step of recognizing the touch input, when the second touch input signal is detected after a second reference time elapses after the detection of the first touch input signal is stopped, it may be recognized that the second touch input signal is a new touch input.

In the step of recognizing the touch input, when the second touch input signal is detected in the abnormal signal generation section, in the case in which a vehicle acceleration of a reference or more is generated in the abnormal signal generation section, the signal interpolation may be performed between the first touch input signal and the second touch input signal.

In the step of recognizing the touch input, in the case in which the vehicle acceleration of the reference or more is not generated in the abnormal signal generation section, it may be recognized that the second touch input signal is a new touch input.

In the step of recognizing the touch input, in the case in which the first touch input signal is less than a threshold, when the second touch input signal is detected within the first reference time after the first touch input signal less than the threshold is detected, the signal interpolation may be performed between the first touch input signal and the second touch input signal.

In the step of recognizing the touch input, when the second touch input signal is detected after a second reference time elapses after the first touch input signal less than the threshold is detected, it may be recognized that the second touch input signal is a new touch input.

In the step of recognizing the touch input, in the case in which a vehicle acceleration of a reference or more is generated in a section in which the abnormal signal is generated, the signal interpolation may be performed between the first touch input signal and the second touch input signal.

In the step of recognizing the touch input, in the case in which a high frequency component is decreased in the abnormal signal detected in the section in which the abnormal signal is generated, the signal interpolation may be performed between the first touch input signal and the second touch input signal.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Since the terms "include", "is configured of", "have", and the like, described in the present disclosure mean the inclusion of corresponding components unless particularly described otherwise, they will mean the inclusion of other components but not the exclusion of other components.

The terms "part", "module", and the like, described in the present disclosure mean a unit of processing at least one function or operation and may be implemented by hardware or software or a combination of hardware and software. In addition, terms "one", "a", "the", and the like, may be used as the meaning including both of the singular number and the plural number unless described otherwise in the present disclosure in a context describing the present disclosure or clearly contradicted by the context.

Hereinafter, exemplary embodiments of the present disclosure will be described in detail with reference to the accompanying drawings.

The purpose of the present disclosure is to cope with an error generated when a hand of a user touching a pad is separated from the pad or a magnitude of touch force of the user is instantaneously decreased to a threshold or less due to vibrations generated by acceleration or rapid movement generated in a vehicle. In other words, the present disclosure is to suggest a technology for recognizing a touch input appropriate for a vehicle environment in order to use a force-based touch pad in a vehicle.

Figure 1:
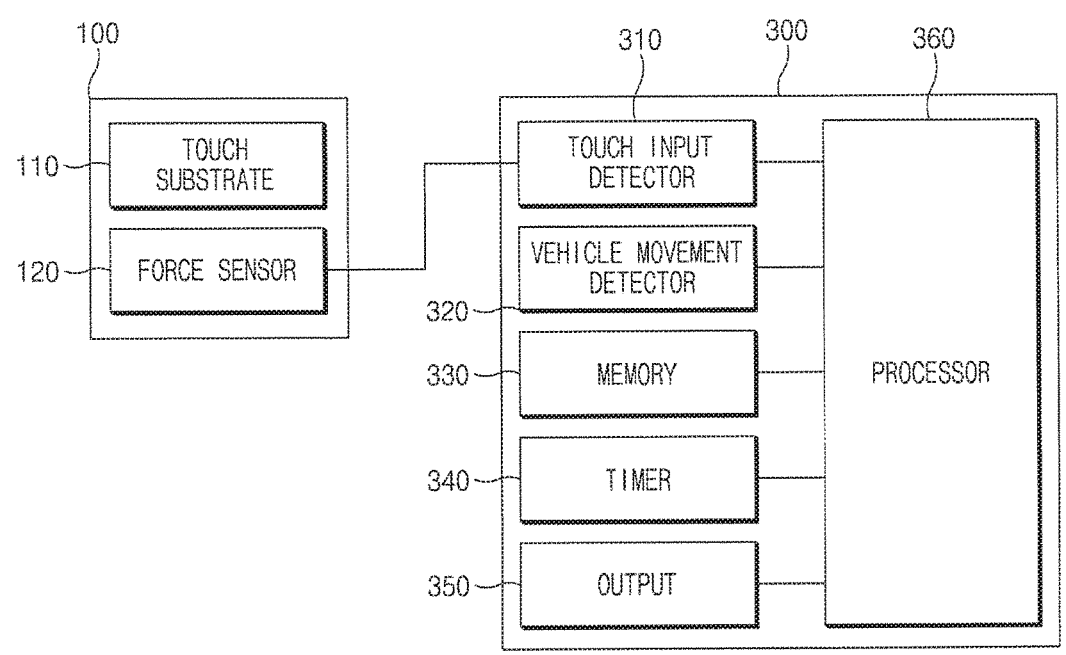
FIG. 1 is a block diagram of an apparatus for recognizing a touch input according to an exemplary embodiment of the present disclosure.
Figure 2:
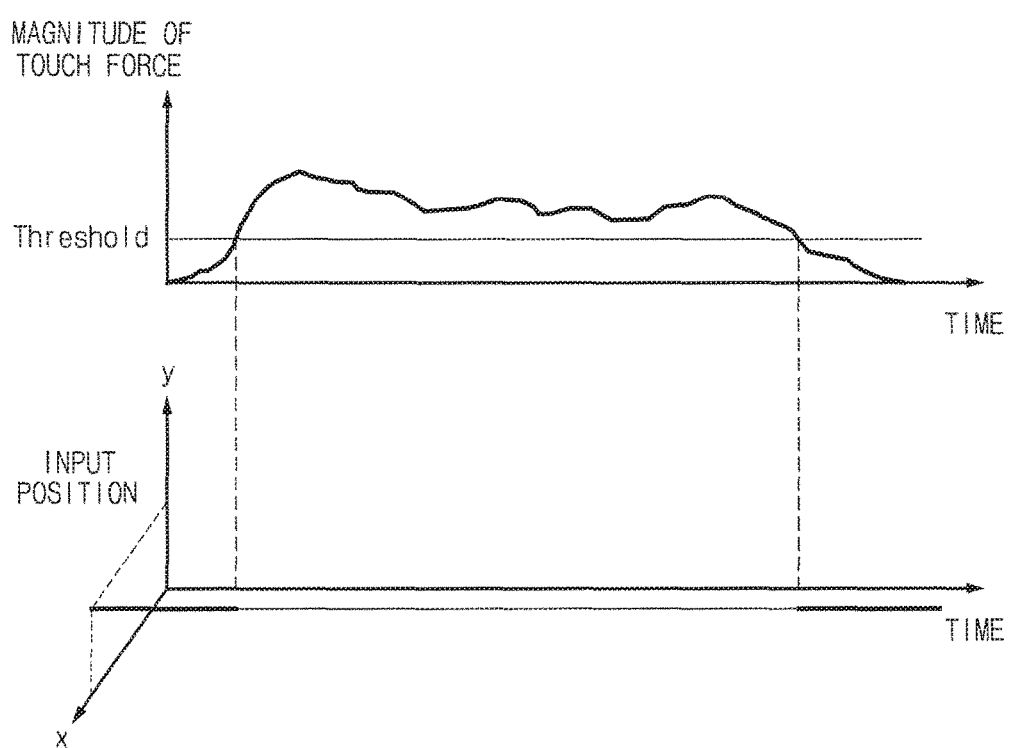
FIG. 2 is a view for describing a touch force input of a user.
Figure 3:
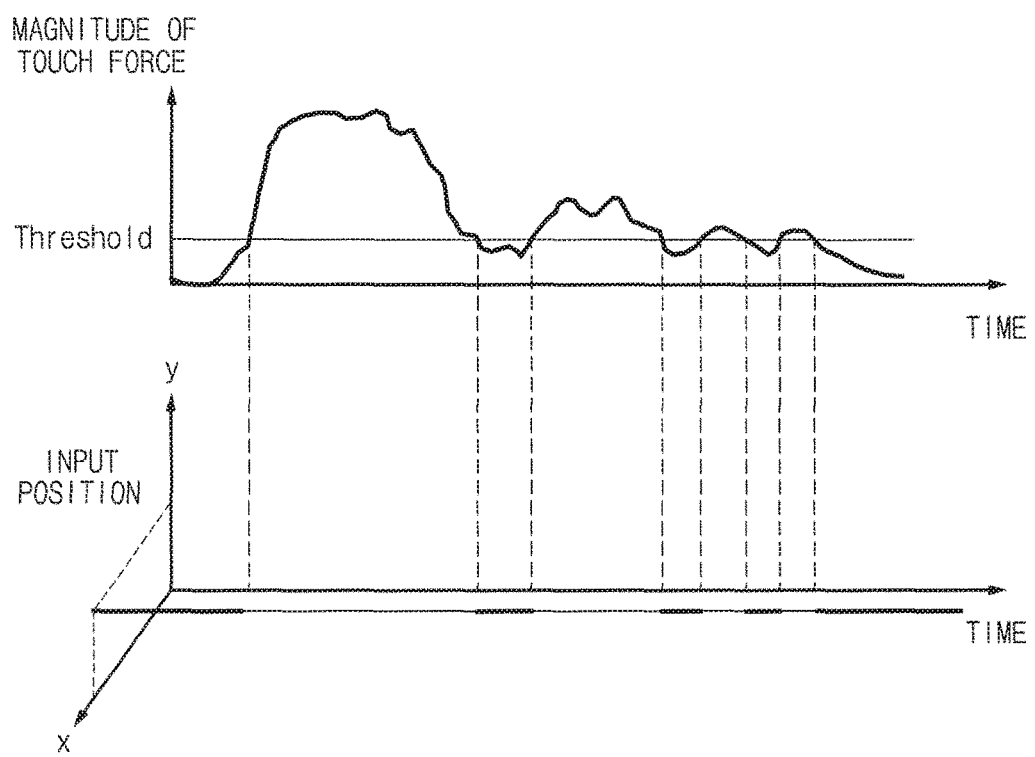
FIG. 3 is a view for describing a touch input signal affected by an external factor.
Figure 4:
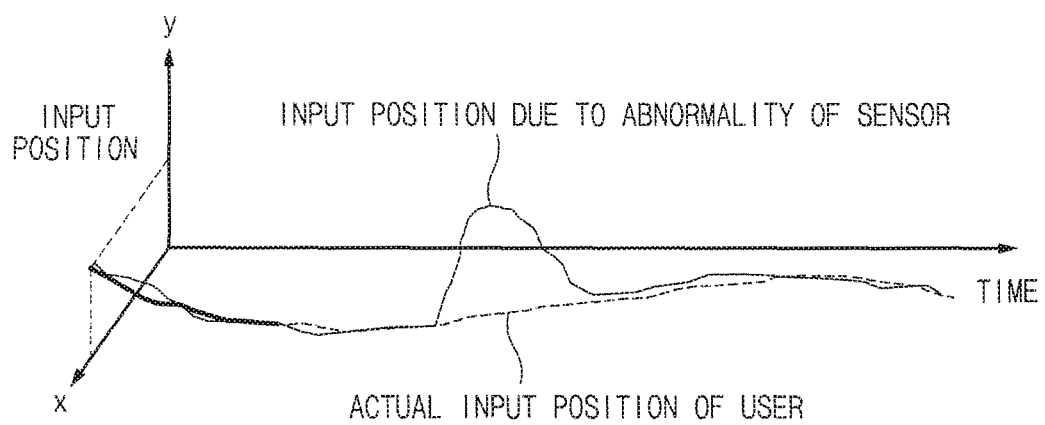
FIG. 4 is a view for describing a profile of a touch input signal due to abnormality of a sensor.

FIG. 1 is a block diagram of an apparatus for recognizing a touch input according to an exemplary embodiment of the present disclosure, FIG. 2 is a view for describing a touch force input of a user, FIG. 3 is a view for describing a touch input signal affected by an external factor, and FIG. 4 is a view for describing a profile of a touch input signal due to abnormality of a sensor.

As illustrated in FIG. 1, the apparatus 300 for recognizing a touch input according to an exemplary embodiment of the present disclosure includes a touch input detector 310, a vehicle movement detector 320, a memory 330, a timer 340, an output 350, and a processor 360. The apparatus 300 for recognizing a touch input may be implemented as one module together with a touch pad 100.

The touch pad 100 senses a force-based touch input by a user. Here, the touch input may have a form of a push input, a drag input, or the like. The touch pad 100 is disposed in a dash board, a center fascia, a console box, or the like, in a vehicle.

The touch pad 100 includes a touch substrate 110 and a force sensor 120.

The touch substrate 110 is a region applying touch force using a touch means such as a finger of the user, a stylus pen, or the like. The touch substrate 110 may be formed of an acryl resin, a plastic, a glass, or the like.

In addition, the touch substrate 110 may be implemented by a touch panel or a touch screen including a touch sensor.

The force sensor 120 measures touch force applied onto the touch substrate 110, and generates and outputs force signals corresponding to the touch force. The force sensor 120 includes a plurality of force sensors that may measure force applied onto the touch substrate 110. The plurality of force sensors may be installed at different positions, and may be sensors such as a strain gauge, a force sensitive resistor (FSR), a capacitance sensor, or the like.

The touch input detector 310 senses touch force applied onto the touch pad 100 when the touch force is applied onto the touch pad 100, and measures a magnitude of the touch force applied onto the touch pad 100 through the force sensing module 120.

In other words, the touch input detector 310 collects force signals output from the respective force sensors constituting the force sensor 120.

The vehicle movement detector 320 detects movement of the vehicle. For example, the vehicle movement detector 320 senses vertical movement of the vehicle generated when the vehicle passes through a speed bump, or the like, forward or backward movement of the vehicle due to acceleration or deceleration of the vehicle, and the like.

The vehicle movement detector 320 measures an acceleration of the vehicle through an acceleration sensor (not illustrated). In this case, the vehicle movement detector 320 measures the acceleration of the vehicle using an acceleration sensor separately provided in the touch pad 100 or the apparatus 300 for recognizing a touch input, an acceleration sensor provided in the vehicle, or the like.

The memory 330 stores a force-based touch input recognizing algorithm, a force-based touch position recognizing algorithm, reference data, set information, and the like, therein. In addition, the memory 330 stores input data and output data of the apparatus 300 for recognizing a touch input therein.

The memory 330 may be implemented by one or more of storage media such as a flash memory, a hard disk, a secure digital (SD) card, a random access memory (RAM), a read only memory (ROM), a web storage, and the like.

The timer 340 measures an elapse time. The number of timers 340 may be one or more. Although a case in which a separate timer 340 is provided has been described by way of example in the present exemplary embodiment, the apparatus 300 for recognizing a touch input may also be implemented to use a timer provided in the processor 360.

The output 350 generates a control signal corresponding to the recognized touch input, and transmits the control signal to an external device connected to the apparatus 300 for recognizing a touch input. Here, the external device may be a display device, an audio device, a navigation device, or the like, provided in the vehicle.

The processor 360 receives a touch input signal through the touch input detector 310 when the touch force is applied onto the touch pad 100. The touch input signal is a force signal including information on a magnitude of force obtained by measuring the touch force. The processor 360 recognizes that the touch input is a touch input in which a user's intension is reflected, when a magnitude of the force signal (the touch force) is a threshold or more.

For example, in an environment in which the touch input is not hindered by external factors (vehicle vibrations, acceleration, and the like), a magnitude of touch force applied to the touch pad 100 by the user has a profile as illustrated in FIG. 2. The magnitude of the touch force has a form in which it is increased to a threshold or more when the user inputs touch force with an input intention, is maintained at the threshold or more for a period in which the input intention is present, is continued until the touch input ends, and is rapidly decreased when the input intention disappears to stop the input of the touch force.

When the user performs the touch input with the input intention, if the touch input is hindered by an external factor, distortion is generated in the touch input signal, as illustrated in FIG. 3.

For example, a section in which the magnitude of the touch force is decreased to a value less than the threshold due to vibrations generated at the time of driving the vehicle although the user applies the touch force to the touch pad with the input intention is generated. Therefore, one touch input may be recognized as several touch inputs.

When abnormality is generated in a sensor, a touch position is rapidly changed as illustrated in FIG. 4. In other words, the processor 360 recognizes that an abnormal signal is generated when a movement speed of the touch position exceeds a limit speed that may be input by a person.

The processor 360 detects an abnormal signal generation section in which an abnormal signal is generated in the touch input signal. The abnormal section indicates a discontinuous section of the touch input signal or a section in which a touch input signal less than a threshold is detected. The processor 360 estimates (calculates) a magnitude of the touch input signal in the abnormal section. In this case, the processor 360 estimates the magnitude of the touch input signal using interpolation or an estimation filter. Linear interpolation, exponential interpolation, bilinear interpolation, spline interpolation, or the like, may be used as the interpolation, and Kalman filter, recursive Bayesian filter, or the like, may be used as the estimation filter.

When a new second touch input signal is detected within a first reference time after reception of a first touch input signal output the force sensor 120 of the touch pad 100 is stopped, the processor 360 performs interpolation between the first touch input signal and the second touch input signal to recognize that the interpolated first and second touch input signals are one touch input signal.

The processor 360 recognizes that the second touch input signal is a new touch input, when the second touch input signal is detected after a second reference time elapses after the reception of the first touch input signal is stopped.

The processor 360 confirms whether or not a vehicle acceleration of a reference or more is generated in a section (an abnormal signal generation section) in which detection of the first touch input signal is stopped, when the second touch input signal is detected within a time that exceeds the first reference time and is within the second reference time. The processor 360 performs the interpolation between the first touch input signal and the second touch input signal, when the vehicle acceleration of the reference or more is generated.

The processor 360 confirms whether or not a high frequency component is decreased in an abnormal signal detected in the abnormal signal generation section, when the vehicle acceleration of the reference or more is not generated. The processor 360 performs the interpolation between the first touch input signal and the second touch input signal, when the high frequency component is decreased.

The processor 360 recognizes that the second touch input signal is a new touch input, when the high frequency component is not decreased in the abnormal signal.

Figure 5A:
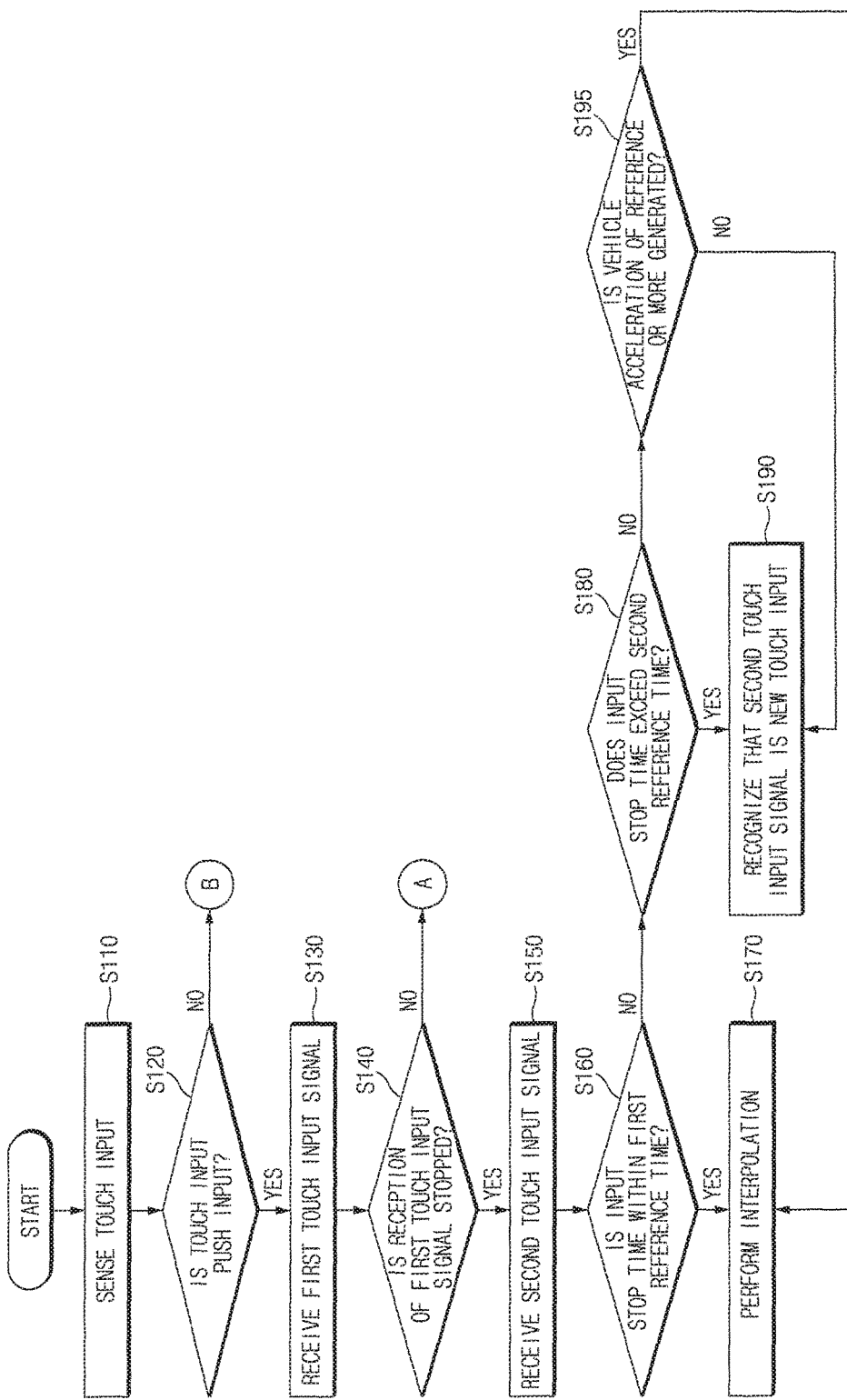
FIGS. 5A to 5D are flow charts illustrating a method for recognizing a touch input according to an exemplary embodiment of the present disclosure.
Figure 5B:
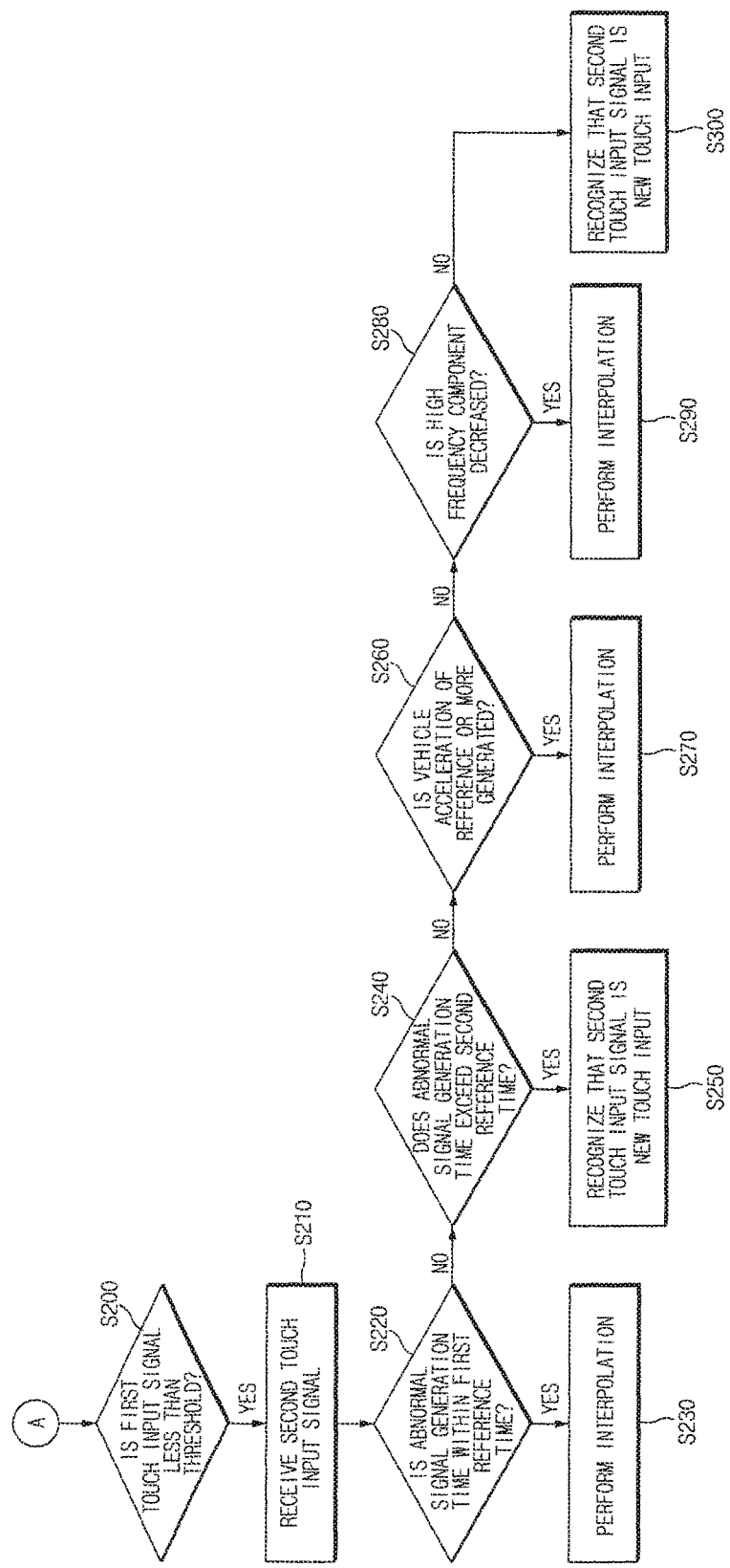
Figure 5C:
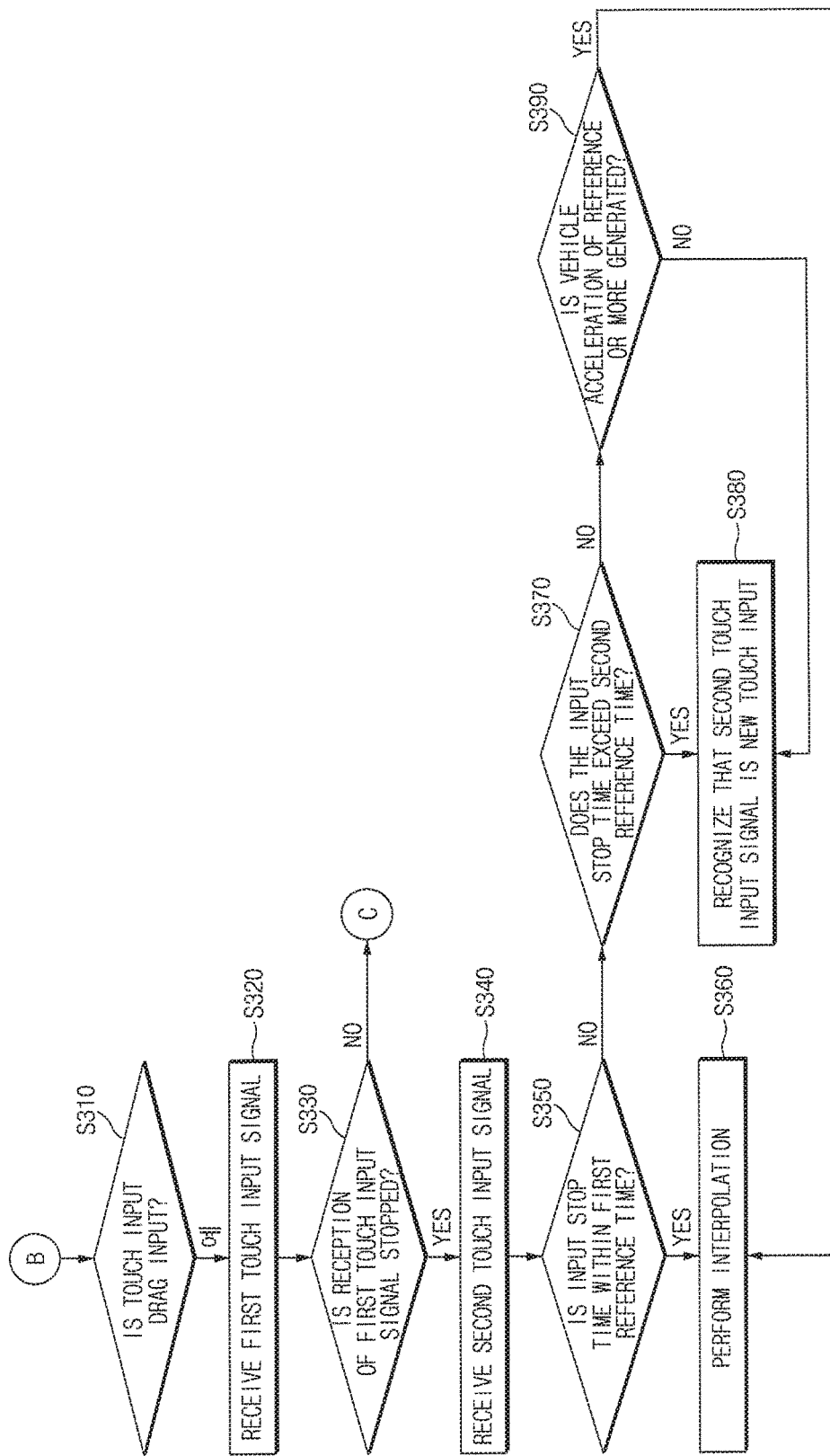
Figure 5D:
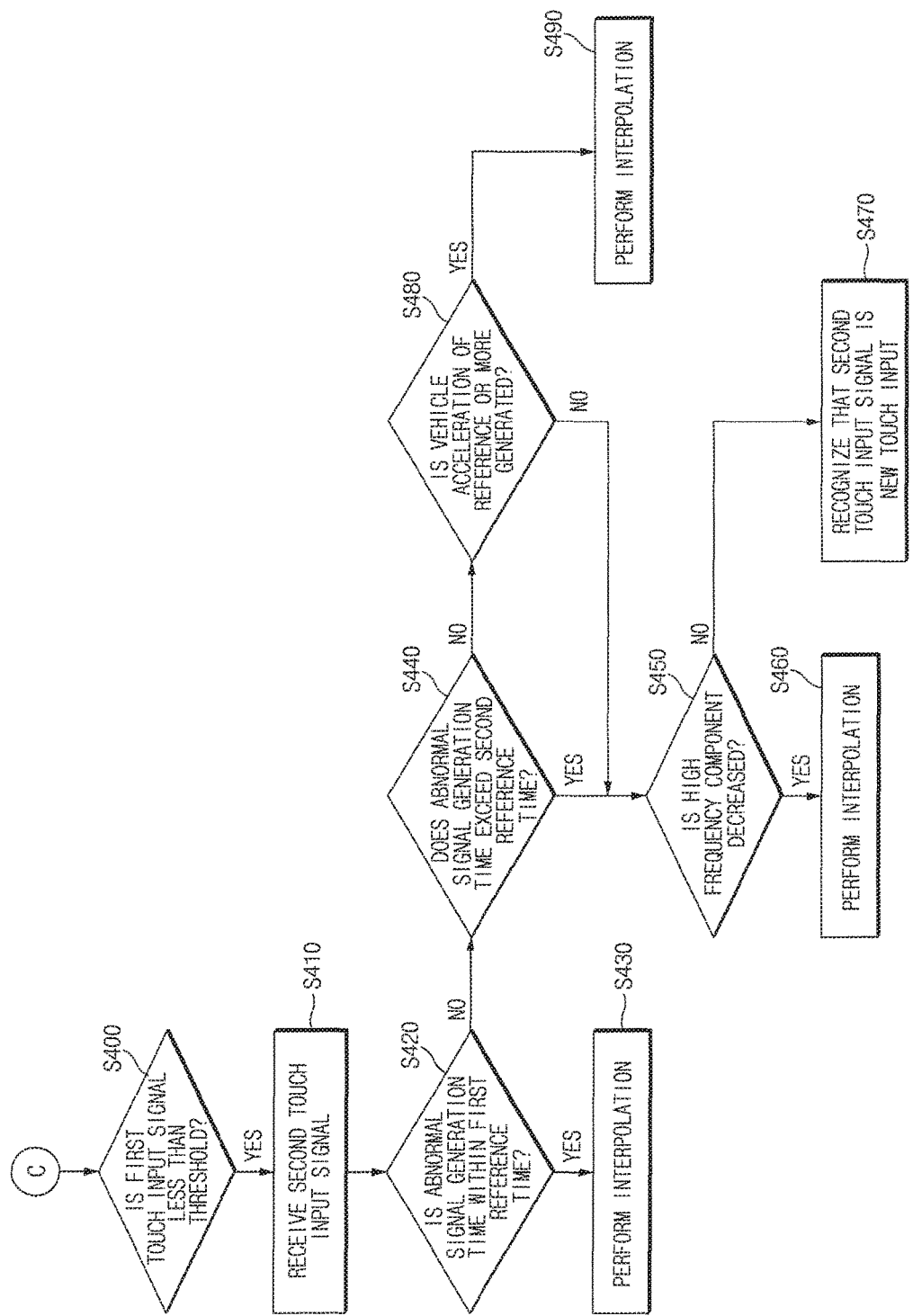

FIGS. 5A and 5D are flow charts illustrating a method for recognizing a touch input according to an exemplary embodiment of the present disclosure.

The processor 360 of the apparatus 300 for recognizing a touch input senses a touch input through the touch input detector 310 (S110). When a user applies touch force onto the touch pad 100, the processor 360 detects a signal sensed by the force sensor 120.

The processor 360 confirms whether or not the touch input is a push input (S120). The processor 360 recognizes that the sensed touch input is the push input, when a variation of a touch position is maintained within 20 mm.

When the touch input is the push input, the processor 360 receives a first touch input signal (S130). Here, the first touch input signal is a touch force signal measured by the force sensor 120 when the touch input is the push input.

The processor 360 confirms whether or not reception (detection) of the first touch input signal is stopped (S140). That is, the processor 360 confirms whether or not a magnitude of the first touch input signal is '0'.

When the reception of the first touch input signal is stopped, the processor 360 operates the timer 340, and waits until a second touch input signal is received. The processor 360 receives the second touch input signal (S150), after the reception of the first touch input signal is stopped.

When the second touch input signal is received, the processor 360 confirms whether or not a time (hereinafter, referred to as an input stop time) in which the reception of the first touch input signal is stopped is within a first reference time (S160). Here, the first reference time is 230 ms.

When the input stop time (an abnormal signal generation section) is within the first reference time, the processor 360 performs interpolation connecting the first touch input signal and the second touch input signal to each other (S170).

On the other hand, when the input stop time exceeds the first reference time, the processor 360 confirms whether or not the input stop time exceeds a second reference time (S180). Here, the second reference time is 500 ms. The first reference time and the second reference time are times calculated in advance through an experiment.

When the input stop time exceeds the second reference time, the processor 360 recognizes that the second touch input signal is a new touch input (S190).

On the other hand, when the input stop time exceeds the first reference time and is within the second reference time, the processor 360 confirms whether or not a vehicle acceleration of a reference or more is generated for the input stop time (S195). In other words, the processor 360 confirms whether or not an abnormal signal is generated for the input stop time. For example, the processor 360 confirms whether or not vertical vibrations or forward or backward rapid acceleration and rapid deceleration of the vehicle are generated in a section in which the touch input is stopped.

When the vehicle acceleration of the reference or more is generated, the processor 360 connects the first touch input signal and the second touch input signal to each other using interpolation (S170).

On the other hand, when the vehicle acceleration of the reference or more is not generated for the input stop time, the processor 360 recognizes that the second touch input signal is the new touch input (S190).

When the reception of the first touch input signal is not stopped in S140, the processor 360 confirms whether or not the first touch input signal (a magnitude of force) is less than a threshold (S200).

When the first touch input signal is less than the threshold, the processor 360 waits until the second touch input signal is received (S210).

When the second touch input signal is received, the processor 360 confirms whether or not a time (hereinafter, referred to an abnormal signal generation time) in which the first touch input signal (an abnormal signal) less than the threshold is input is within a first reference time (S220).

When the abnormal signal generation time is within the first reference time, the processor 360 performs interpolation on a section in which the abnormal signal is generated (S230).

When the abnormal signal generation time is not within the first reference time, the processor 360 confirms whether or not the abnormal signal generation time exceeds a second reference time (S240).

When the abnormal signal generation time exceeds the second reference time, the processor 360 recognizes that the second touch input signal is a new touch input (S250).

When the abnormal signal generation time does not exceed the second reference time in S240, the processor 360 confirms whether or not a vehicle acceleration of a reference or more is generated in the abnormal signal generation section (S260).

When the vehicle acceleration of the reference or more is generated in the abnormal signal generation section, the processor 360 performs interpolation on the abnormal signal generation section (S270).

When the vehicle acceleration of the reference or more is not generated in the abnormal signal generation section, the processor 360 confirms whether or not a high frequency component is decreased in an input signal detected in the abnormal signal generation section (S280). In the case in which touch force is applied to the touch pad 100 using a finger, the finger serves as a low pass filter (LPF), such that a frequency of the touch pad 100 is output in a form in which a frequency component of vehicle acceleration is removed. When a frequency of a signal detected in the touch pad 100 has a form in which a high frequency component of a frequency generated by behavior of the vehicle is removed, it is decided that a user's input intention is present, but the finger is separated from the touch pad 100 due to an external environment.

When the high frequency component is decreased in the input signal, the processor 360 performs interpolation on the abnormal signal generation section (S290).

On the other hand, when the high frequency component is not decreased in the input signal, the processor 360 recognizes that the second touch input signal is a new touch input (S300).

On the other hand, when the touch input is not the push input, the processor 310 confirms whether or not the touch input is a drag input (S310). When a movement of the touch position exceeds 20 mm and a movement speed is generated, the processor 360 recognizes the touch input is the drag input.

When the touch input is the drag input, the processor 360 receives a first touch input signal (S320). Here, the first touch input signal is a touch force signal generated by the drag input.

The processor 360 confirms whether or not reception of the first touch input signal (a magnitude of touch force) is stopped (S330). That is, the processor 360 confirms whether or not a magnitude of the first touch input signal is '0'.

When the reception of the first touch input signal is stopped, the processor 360 operates the timer 340, and waits until a second touch input signal is received (S340).

When the second touch input signal is received after the reception of the first touch input signal is stopped, the processor 360 confirms whether or not a time (hereinafter, referred to as an input stop time) in which the reception of the first touch input signal is stopped is within a first reference time (S350).

When the input stop time is within the first reference time, the processor 360 performs interpolation connecting the first touch input signal and the second touch input signal to each other (S360). The processor 360 decides that the touch input is detected as the first touch input signal and the second touch input signal due to an external factor although it is an input with a user's intention, and interpolates the first touch input signal and the second touch input signal to correct the interpolated first and second touch input signals to be one touch input signal.

On the other hand, when the input stop time exceeds the first reference time, the processor 360 confirms whether or not the input stop time exceeds a second reference time (S370).

When the input stop time exceeds the second reference time, the processor 360 recognizes that the second touch input signal is a new touch input (S380). That is, the processor 360 recognizes that an input stop section is a search section in which a point to which touch force will be applied is searched.

On the other hand, when the input stop time exceeds the first reference time and is within the second reference time, the processor 360 confirms whether or not a vehicle acceleration of a reference or more is generated for the input stop time (S390).

When the vehicle acceleration of the reference or more is generated, the processor 360 performs interpolation between the first touch input signal and the second touch input signal (S360).

On the other hand, when the vehicle acceleration of the reference or more is not generated for the input stop time, the processor 360 recognizes that the second touch input signal is the new touch input (S380).

When the reception of the first touch input signal is not stopped in S330, the processor 360 confirms whether or not the first touch input signal (a magnitude of force) is less than a threshold (S400).

When the first touch input signal is less than the threshold, the processor 360 waits until the second touch input signal is received (S410).

When the second touch input signal is received, the processor 360 confirms whether or not a time (hereinafter, referred to an abnormal signal generation time) in which the first touch input signal less than the threshold is input is within a first reference time (S420).

When the abnormal signal generation time is within the first reference time, the processor 360 performs interpolation on an abnormal signal generation section (S430). In other words, the processor 360 connects between the first touch input signal and the second touch input signal.

When the abnormal signal generation time is not within the first reference time, the processor 360 confirms whether or not the abnormal signal generation time exceeds a second reference time (S440).

When the abnormal signal generation time exceeds the second reference time, the processor 360 confirms whether or not a high frequency component is decreased in an abnormal signal detected in the abnormal signal generation section (S450).

When the high frequency component is decreased in the abnormal signal, the processor 360 performs the interpolation between the first touch input signal and the second touch input signal (S460).

On the other hand, when the high frequency component is not decreased in the abnormal signal in S450, the processor 360 recognizes that the second touch input signal is a new touch input (S470).

When the abnormal signal generation time does not exceed the second reference time in S440, the processor 360 confirms whether or not a vehicle acceleration of a reference or more is generated in the abnormal signal generation section (S480).

When the vehicle acceleration of the reference or more is generated in the abnormal signal generation section, the processor 360 performs interpolation on the abnormal signal generation section (S490).

When vehicle acceleration of the reference or more is not generated in the abnormal signal generation section, the processor 360 performs S450.

Although it has been described that all components configuring the exemplary embodiment of the present disclosure are combined with each other as one component or are combined and operated with each other as one component, the present disclosure is not necessarily limited to the above-mentioned exemplary embodiment. That is, all the components may also be selectively combined and operated with each other as one or more components without departing from the scope of the present disclosure. In addition, although each of all the components may be implemented by one independent hardware, some or all of the respective components which are selectively combined with each other may be implemented by a computer program having a program module performing some or all of functions combined with each other in one or plural hardware. Codes and code segments configuring the computer program may be easily inferred by those skilled in the art to which the present disclosure pertains. The computer program is stored in computer readable media and is read and executed by a computer, thereby making it possible to implement the exemplary embodiment of the present disclosure.

According to the exemplary embodiment of the present disclosure, when the touch input on the force-based touch pad is recognized, distortion of the input signal due to an external factor is interpolated to estimate a user's intension, thereby making it possible to recognize the touch input. Therefore, in the exemplary embodiment of the present disclosure, an input error that is not intended by the user due to vibrations in the vehicle or acceleration of the vehicle may be decreased.

In addition, in the exemplary embodiment of the present disclosure, erroneous recognition due to an input error that may be generated when the touch pad is used in the vehicle is prevented, thereby making it possible to improve accuracy of recognition of the touch pad.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for recognizing a touch input, the apparatus comprising:
   a touch sensor detecting a touch input signal depending on a force-based touch input on a touch pad;
   a vehicle motion sensor sensing movement of a vehicle; and
   a processor configured to detect an abnormal signal generated by the movement of the vehicle in the touch input signal and to recognize the touch input by performing signal interpolation on an abnormal signal generation section in which the abnormal signal is generated when a high frequency component is decreased in the abnormal signal.

2. The apparatus according to claim 1, wherein the touch pad includes:
   a touch substrate; and
   a force sensor measuring a touch force applied onto the touch substrate.

3. The apparatus according to claim 2, wherein the force sensor includes a plurality of force sensors, and
   wherein the force sensor is any one of a strain gauge, a force sensitive resistor (FSR), and a capacitance sensor.

4. The apparatus according to claim 1, wherein the vehicle motion sensor detects an acceleration of the vehicle using an acceleration sensor provided in the vehicle or an acceleration sensor mounted in the touch pad.

5. The apparatus according to claim 1, wherein the abnormal signal generation section is a discontinuous section of the touch input signal or a section in which the touch input signal less than a threshold is detected.

6. The apparatus according to claim 1, wherein the processor performs the signal interpolation between a first touch input signal and a second touch input signal, when the second touch input signal is detected within a first reference time after detection of the first touch input signal is stopped.

7. The apparatus according to claim 6, wherein the processor recognizes that the second touch input signal is a new touch input, when the second touch input signal is detected after a second reference time elapses after the detection of the first touch input signal is stopped.

8. The apparatus according to claim 7, wherein the processor connects the first touch input signal and the second touch input signal to each other using the signal interpolation, when the high frequency component is decreased in the abnormal signal generation section between the first touch input signal and the second touch input signal.

9. The apparatus according to claim 8, wherein the processor recognizes that the second touch input signal is a new touch input when the high frequency component is not decreased in the abnormal signal generation section.

10. A method for recognizing a touch input, the method comprising steps of:
sensing, by a processor, a force-based touch input on a touch pad;
deciding, by the processor, a form of the touch input;
receiving, by the processor, a touch input signal depending on the touch input;
confirming, by the processor, whether or not an abnormal signal is generated in the touch input signal; and
recognizing, by the processor, the touch input by performing signal interpolation on an abnormal signal generation section in consideration of movement of a vehicle, when the abnormal signal is detected in the touch input signal,
wherein the processor performs the signal interpolation on the abnormal signal generation section when a high frequency component is decreased in the abnormal signal.

11. The method according to claim 10, wherein in the step of deciding the form of the touch input, the touch input is divided into a push input and a drag input.

12. The method according to claim 10, wherein in the step of confirming whether or not the abnormal signal is generated, and
wherein it is confirmed whether or not a discontinuous section of the touch input signal or a section in which a touch input signal less than a threshold is detected is present.

13. The method according to claim 10, wherein in the step of recognizing the touch input,
when a second touch input signal is detected within a first reference time after detection of a first touch input signal is stopped, the signal interpolation is performed between the first touch input signal and the second touch input signal.

14. The method according to claim 13, wherein in the step of recognizing the touch input,
when the second touch input signal is detected after a second reference time elapses after the detection of the first touch input signal is stopped, it is recognized that the second touch input signal is a new touch input.

15. The method according to claim 14, wherein in the step of recognizing the touch input,
when the second touch input signal is detected after the first reference time elapses and within the second reference time elapses after the detection of the first touch input signal, and a vehicle acceleration of a reference or more is generated in the abnormal signal generation section, the signal interpolation is performed between the first touch input signal and the second touch input signal.

16. The method according to claim 15, wherein in the step of recognizing the touch input,
when the second touch input signal is detected after the first reference time elapses and within the second reference time elapses after the detection of the first touch input signal, and the vehicle acceleration of the reference or more is not generated in the abnormal signal generation section, it is recognized that the second touch input signal is a new touch input.

17. The method according to claim 13, wherein in the step of recognizing the touch input,
when the first touch input signal is less than a threshold in which the second touch input signal is detected within the first reference time after the first touch input signal less than the threshold is detected, the signal interpolation is performed between the first touch input signal and the second touch input signal.

18. The method according to claim 17, wherein in the step of recognizing the touch input,
when the second touch input signal is detected after a second reference time elapses after the first touch input signal less than the threshold is detected, it is recognized that the second touch input signal is a new touch input.

19. The method according to claim 18, wherein in the step of recognizing the touch input,
when a vehicle acceleration of a reference or more is generated in the abnormal signal generation section, the signal interpolation is performed between the first touch input signal and the second touch input signal.

20. The method according to claim 19, wherein in the step of recognizing the touch input,
when the high frequency component is decreased in the abnormal signal detected in the the abnormal signal generation section, the signal interpolation is performed between the first touch input signal and the second touch input signal.

* * * * *